(12) United States Patent
Regan

(10) Patent No.: US 9,310,023 B2
(45) Date of Patent: Apr. 12, 2016

(54) METHODS AND SYSTEMS FOR DISTRIBUTING INERT GAS IN AN AIRCRAFT

(71) Applicant: THE BOEING COMPANY, Huntington Beach, CA (US)

(72) Inventor: Casey Charles Regan, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/567,241

(22) Filed: Dec. 11, 2014

(65) Prior Publication Data

US 2015/0291291 A1    Oct. 15, 2015

Related U.S. Application Data

(63) Continuation-in-part of application No. 13/922,748, filed on Jun. 20, 2013.

(51) Int. Cl.
*F17C 1/00* (2006.01)
*B64C 13/40* (2006.01)
*B64D 37/32* (2006.01)
*F16L 1/00* (2006.01)

(52) U.S. Cl.
CPC . *F17C 1/00* (2013.01); *B64C 13/40* (2013.01); *B64D 37/32* (2013.01); *F16L 1/00* (2013.01)

(58) Field of Classification Search
CPC ............. F16L 9/18; F16L 9/19; F16L 39/005; F16L 11/20; F16L 59/06; B64D 37/08; B64D 37/14; B64D 37/20
USPC ................. 137/592, 588, 590; 138/114, 148; 244/135 R; 239/423, 424
See application file for complete search history.

(56) References Cited

U.S. PATENT DOCUMENTS

| 531,615 | A | | 12/1894 | James | |
|---|---|---|---|---|---|
| 908,414 | A | | 12/1908 | Mellin | |
| 1,521,817 | A | * | 1/1925 | Jerdone, Jr. | ............ F02M 37/02 137/577 |
| 1,877,628 | A | | 9/1932 | Replogle | |

(Continued)

FOREIGN PATENT DOCUMENTS

| DE | 4437380 A1 | 7/1995 |
|---|---|---|
| EP | 1658441 B1 | 10/2011 |
| WO | 9964180 A1 | 12/1999 |

OTHER PUBLICATIONS

Extended European Search Report for related matter 15165348.2 dated Oct. 19, 2015; 7 pp.

(Continued)

*Primary Examiner* — Craig Schneider
*Assistant Examiner* — Daniel P Donegan
(74) *Attorney, Agent, or Firm* — Armstrong Teasdale LLP

(57) ABSTRACT

Methods and systems for distributing an inert gas to an aircraft fuel tank are provided herein. The method includes channeling the inert gas in a first direction via a first distribution line and channeling the inert gas in an opposite second direction via a second distribution line. The second distribution line is concentrically aligned with and circumscribes the first distribution line. The second distribution line includes a termination point within the aircraft fuel tank. The second distribution line defines a plurality of distribution orifices that release of the inert gas into an ullage space of the fuel tank.

20 Claims, 9 Drawing Sheets

(56) References Cited

U.S. PATENT DOCUMENTS

| | | | |
|---|---|---|---|
| 1,880,053 A | 9/1932 | Schur et al. | |
| 2,389,038 A | 11/1945 | Milo | |
| 2,731,709 A | 1/1956 | Gaddis et al. | |
| 2,917,068 A * | 12/1959 | Davis | B64F 1/28 |
| | | | 137/205 |
| 2,930,405 A | 3/1960 | Welsh | |
| 3,253,326 A | 5/1966 | Henry et al. | |
| 3,343,250 A | 9/1967 | Berto et al. | |
| 3,530,882 A * | 9/1970 | Case | F16K 17/19 |
| | | | 137/202 |
| 3,540,487 A | 11/1970 | Lorusso | |
| 3,562,860 A | 2/1971 | Wenzel | |
| 3,601,320 A * | 8/1971 | Plessis | A01G 25/023 |
| | | | 138/114 |
| 3,626,987 A | 12/1971 | Bittner | |
| 3,674,086 A | 7/1972 | Foster | |
| 3,777,502 A | 12/1973 | Michie et al. | |
| 3,797,258 A | 3/1974 | Dubuisson et al. | |
| 3,825,641 A | 7/1974 | Barnett | |
| 3,888,617 A | 6/1975 | Barnett | |
| 4,014,369 A | 3/1977 | Kobres, Jr. | |
| 4,163,474 A | 8/1979 | MacDonald et al. | |
| 4,182,378 A | 1/1980 | Dieter | |
| 4,693,279 A | 9/1987 | Aubert | |
| 4,906,496 A | 3/1990 | Hosono et al. | |
| 4,965,107 A * | 10/1990 | Oshima | B01D 29/111 |
| | | | 138/113 |
| 5,195,680 A | 3/1993 | Holt | |
| 5,327,945 A * | 7/1994 | Simpson | B67D 7/48 |
| | | | 138/114 |
| 5,433,252 A | 7/1995 | Wolf et al. | |
| 5,449,113 A * | 9/1995 | Bruckelmyer | F16L 11/20 |
| | | | 237/1 R |
| 5,592,975 A | 1/1997 | Wissmann et al. | |
| 5,611,373 A | 3/1997 | Ashcraft | |
| 5,630,447 A | 5/1997 | Jensen | |
| 5,791,370 A | 8/1998 | Harland | |
| 5,931,184 A | 8/1999 | Armenia et al. | |
| 5,988,521 A * | 11/1999 | Nohynek | B05B 1/202 |
| | | | 118/24 |
| 6,287,508 B1 | 9/2001 | Stripe | |
| 6,571,832 B1 | 6/2003 | Elliott | |
| 6,685,138 B1 | 2/2004 | Krantz | |
| 6,955,023 B2 | 10/2005 | Rotheroe | |
| 7,942,452 B2 | 5/2011 | Carns et al. | |
| 8,356,637 B2 | 1/2013 | Gregrich et al. | |
| 8,893,748 B2 | 11/2014 | Malas et al. | |
| 2001/0050481 A1 | 12/2001 | Takasaki et al. | |
| 2004/0084028 A1 | 5/2004 | Zdroik | |
| 2004/0187946 A1 | 9/2004 | Herrington | |
| 2004/0261875 A1 | 12/2004 | Witemyre et al. | |
| 2005/0109861 A1 * | 5/2005 | Chen | B01J 4/002 |
| | | | 239/423 |
| 2006/0207672 A1 * | 9/2006 | Henriksson | F16L 55/045 |
| | | | 138/37 |
| 2006/0245989 A1 | 11/2006 | Miller | |
| 2007/0039657 A1 | 2/2007 | Krywitsky | |
| 2007/0241560 A1 * | 10/2007 | Malone | F16L 9/19 |
| | | | 285/319 |
| 2007/0256750 A1 | 11/2007 | Crook | |
| 2008/0134692 A1 | 6/2008 | Crowley | |
| 2009/0255602 A1 | 10/2009 | McMasters et al. | |
| 2012/0304816 A1 | 12/2012 | Yagi | |
| 2013/0048135 A1 | 2/2013 | Blumenthal et al. | |
| 2013/0081734 A1 | 4/2013 | Waugh et al. | |
| 2013/0112304 A1 | 5/2013 | Lanham et al. | |
| 2013/0276436 A1 * | 10/2013 | Jensen | F01N 3/208 |
| | | | 60/303 |
| 2013/0277959 A1 * | 10/2013 | Barthel | F16L 53/002 |
| | | | 285/41 |
| 2013/0312865 A1 * | 11/2013 | Baur | F16L 7/00 |
| | | | 138/148 |
| 2015/0013953 A1 * | 1/2015 | Mandelberg | F28D 7/12 |
| | | | 165/164 |
| 2015/0291291 A1 * | 10/2015 | Regan | B64C 13/40 |
| | | | 137/1 |

OTHER PUBLICATIONS

Explanation of the Drill Systems AP1000 Becker Hammer Drill; Great West Drilling; http://www.greatwestdrilling.com; retrieved from internet Jun. 3, 2013; 4 pages.

U.S. Appl. No. 14/311,738, filed Jun. 23, 2014.

U.S. Appl. No. 14/287,564, filed Mar. 18, 2014.

* cited by examiner

US 9,310,023 B2

METHODS AND SYSTEMS FOR DISTRIBUTING INERT GAS IN AN AIRCRAFT

CROSS REFERENCE TO RELATED APPLICATION

This application is a continuation-in-part of U.S. application Ser. No. 13/922,748, filed Jun. 20, 2013, the disclosure of which is hereby incorporated by reference in its entirety.

BACKGROUND

The present disclosure relates generally to hydraulic systems and, more particularly, to aircraft hydraulic fluid distribution lines.

Known aircraft hydraulic systems use a pressurized supply line to transport hydraulic fluid to a load, and a separate return line for returning the hydraulic fluid from the load back to a storage tank or reservoir. Known pressurized supply lines and return lines are fabricated with a wall thickness that is sufficient to withstand pressure differentials that may exist within the hydraulic system. Separate pressure and return lines may require extra space and hardware. In an aircraft, space is limited, and the additional hardware increases weight, part cost, and installation time. Additionally, pressure lines are generally unprotected and thus, may be susceptible to damage during handling and installation and may be thicker and heavier than necessary.

BRIEF SUMMARY

In one aspect, a gas distribution system is provided. The gas distribution system includes a first distribution line configured to channel a gas in a first direction and a second distribution line configured to channel the gas in an opposite second direction. The second distribution line is concentrically aligned with and circumscribes the first distribution line. The second distribution line includes a termination point within the aircraft fuel tank. The second distribution line defines a plurality of distribution orifices that release of the gas into an ullage space of the fuel tank.

In another aspect, a method of distributing an inert gas to an aircraft fuel tank is provided. The method includes channeling the inert gas in a first direction via a first distribution line and channeling the inert gas in an opposite second direction via a second distribution line. The second distribution line is concentrically aligned with and circumscribes the first distribution line. The second distribution line includes a termination point within the aircraft fuel tank. The second distribution line defines a plurality of distribution orifices that release of the inert gas into an ullage space of the fuel tank.

In yet another aspect, an aircraft inert gas system is provided. The system includes an inert gas generation system positioned within a fuselage of the aircraft and an inert gas distribution system. The inert gas distribution system includes a first distribution line configured to channel inert gas in a first direction and a second distribution line configured to channel the inert gas in an opposite second direction. The second distribution line is concentrically aligned with and circumscribes the first distribution line. The second distribution line includes a termination point within the aircraft fuel tank. The second distribution line defines a plurality of distribution orifices that release of the inert gas into an ullage space of the fuel tank.

DETAILED DESCRIPTION

Figure 1:
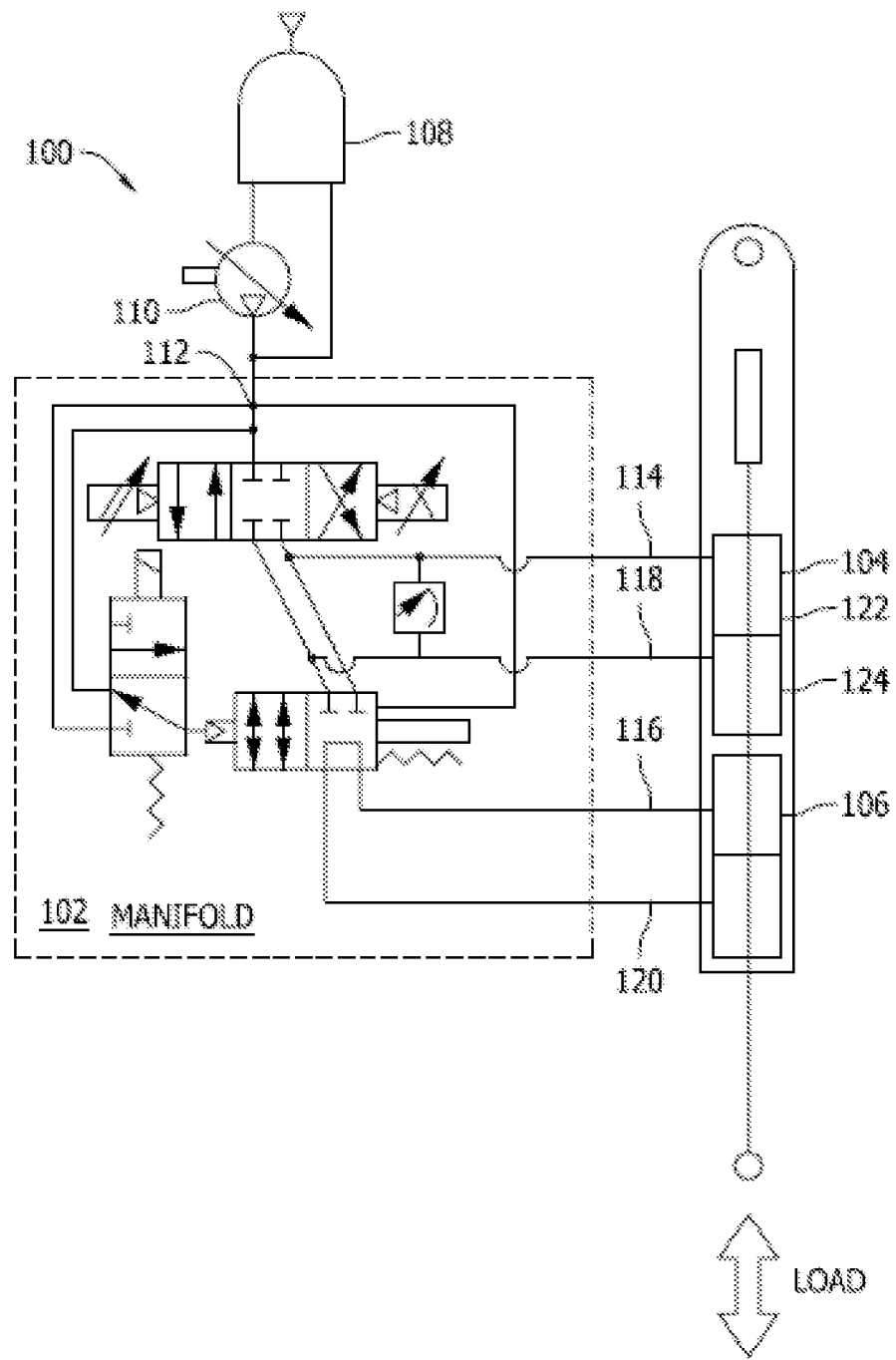
FIG. 1 is a block diagram of an exemplary hydraulic system that may be used in an aircraft.

FIG. 1 is a block diagram of an exemplary hydraulic system 100 that may be used in an aircraft. Hydraulic system 100 includes a manifold 102, a first actuator 104, and a second actuator 106. Manifold 102 is in flow communication to a pressure source (not shown) that includes a fluid reservoir 108 and a pump 110 that supply manifold 102 with a pressurized working fluid via a fluid distribution system 112. Pump 110 may include any type of pump, such as, but not limited to, hydraulic pumps, engine driven pumps, electrically driven pumps, air or wind driven pumps, and/or ram air turbine (RAT) pumps. The working fluid is returned back to fluid reservoir 108 at the reservoir pressure via fluid distribution system 112. From the reservoir 108, the working fluid is then re-supplied to pump 110 via fluid distribution system 112. Accordingly, hydraulic system 100 constitutes a closed fluid system.

First and second actuators 104 and 106, respectively, may include any actuators used in known hydraulic systems. Each actuator 104 and 106, respectively, includes a piston (not shown) movable within an actuator barrel (not shown). Each actuator 104 and 106, respectively, also includes a shaft or rod (not shown). One end of the shaft engages the piston, while the other end of the shaft engages with the flight control surface. The actuator barrel is in flow communication to fluid reservoir 108 and to pump 110 via an extended fluid conduit 114 or 116 and a retracted fluid conduit 118 or 120. Each actuator barrel is sized to enable the piston to move within the barrel when the barrel receives a supply of pressurized working fluid from reservoir 108 and pump 110 via fluid distribution system 112.

Each actuator 104 and 106 is in flow communication to manifold 102 via a respective extended fluid conduit or line 114 or 116, respectively, and via a retracted fluid conduit 118 or 120. When provided with pressurized working fluid, the flow direction of the pressurized working fluid determines whether actuators 104 and 106 extend or retract, and thus operate to retract or extend the flight control surface. For example, first actuator's 104 piston extends when the pressurized working fluid enters an extend side 122 of first actuator 104 via extended fluid conduit 114. Working fluid is discharged from a retract side 124 of first actuator 104 via retracted fluid conduit 118 and is returned to reservoir 108 via fluid distribution system 112. Conversely, first actuator's 104 piston retracts when the pressurized working fluid is provided to retract side 124 via retracted fluid conduit 118. In such a condition, the working fluid is discharged from extend side 122 of first actuator 104 via extended fluid conduit 114 and returned to reservoir 108 via fluid distribution system 112.

Figure 2:
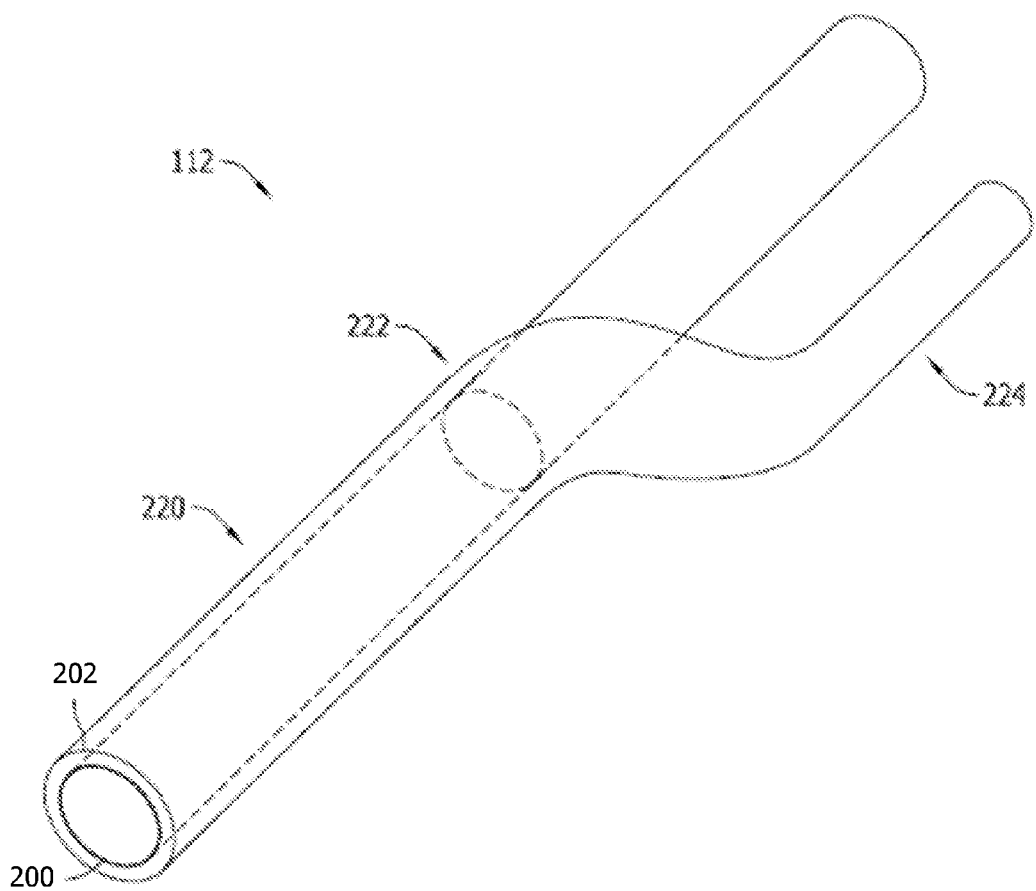
FIG. 2 is a perspective view of an exemplary fluid distribution system that may be used in the aircraft hydraulic system shown in FIG. 1.
Figure 3:
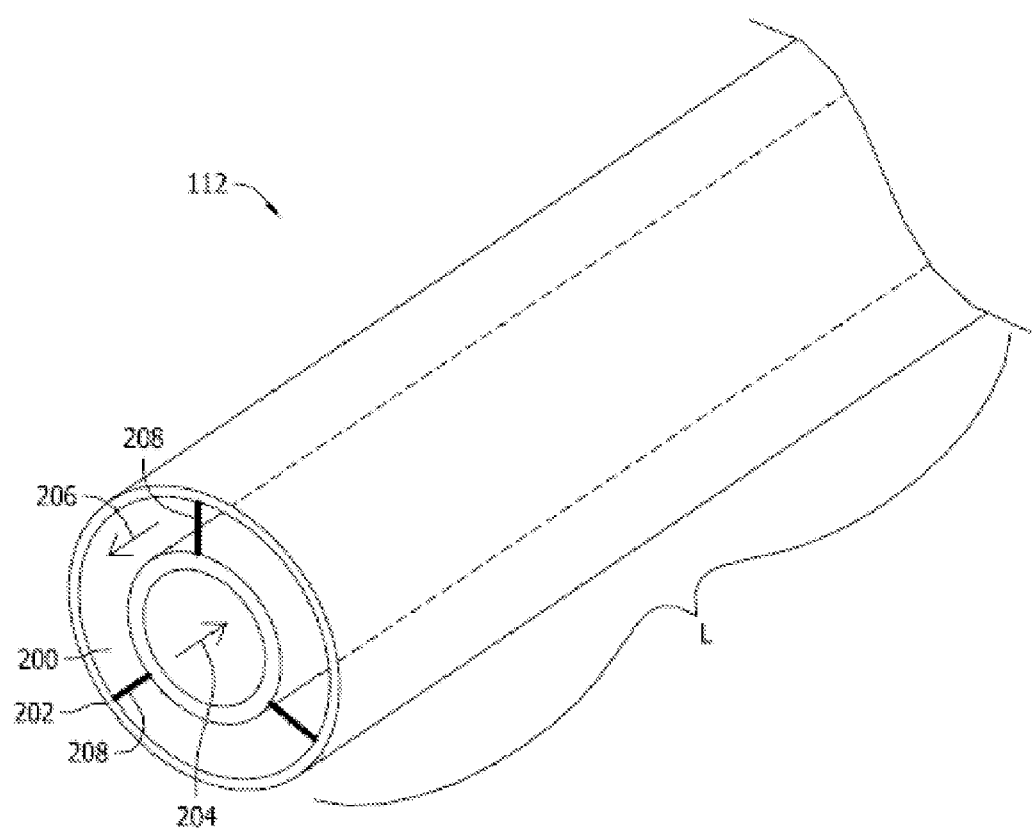
FIG. 3 is an enlarged perspective view of the fluid distribution system shown in FIG. 2.

FIG. 2 is a perspective view of an exemplary fluid distribution system 112, and FIG. 3 is an enlarged perspective view of fluid distribution system 112 that may be used in aircraft hydraulic system 100 (shown in FIG. 1). In the exemplary implementation, fluid distribution system 112 includes a first, inner line 200 and a second, outer line 202. Outer line 202 includes a first portion 220, a second portion 224, and an interface portion 222 located therebetween. Inner line 200 extends in a substantially linear direction and is sized for insertion into outer line 202 at interface region 222. More specifically, inner line 200 is insertable into outer line 202 with an interference fit at interface region 222, and is substantially concentric with first portion 220. Second portion 224 then extends transversely from interface region 222 to couple in flow communication with fluid reservoir 108 (shown in FIG. 1).

Inner line 200 is concentrically positioned within outer line 202 along a full length L of fluid distribution system 112. More specifically, outer line 202 is radially outward from inner line 200. Fluid distribution system 112 is configured to channel a fluid in a first direction 204 via inner line 200 and channel fluid in a second direction 206 that is opposite first direction 204 via outer line 202.

In the exemplary implementation, inner line 200 is a pressure supply line 200 that delivers pressurized working fluid to manifold 102 (shown in FIG. 1). Further, in the exemplary implementation, outer line 202 is a return line 202 that returns the working fluid to fluid reservoir 108 (shown in FIG. 1). Because return line 202 circumferentially surrounds pressure supply line 200, at least a portion of hoop stresses induced to pressure supply line 200 are reduced, thus enabling pressure supply line 200 to be fabricated with a thinner wall thickness than other known pressure supply lines. In some implementations, one or more internal support members 208 extend between pressure supply line 200 and return line 202 to provide enhanced structural support and to facilitate preventing bending and/or disfigurement of fluid distribution system 112. In an alternative implementation, return line 202 may be concentrically positioned within pressure supply line 200.

In the exemplary embodiment, fluid distribution system 112 is fabricated using an additive manufacturing process. Specifically, an additive manufacturing process known as direct metal laser sintering (DMLS) or direct metal laser melting (DMLM) is used to manufacture fluid distribution system 112. Although the fabrication process is described herein as DMLS, one having ordinary skill in the art would understand that DMLM could also be used. Alternatively, the additive manufacturing method is not limited to the DMLS or DMLM process, but may be any known additive manufacturing process that enables fluid distribution system 112 to function as described herein. This fabrication process eliminates complex joints and structures that would typically be defined between separate components that require welding or brazing. Rather, DMLS is an additive layer process that produces a metal component directly from a CAD model using a laser and a fine metal powder. The result is a monolithic distribution system having concentric first and second distribution lines connected by support members. The distribution system may further include ducts that extend from the first and second distribution lines that are configured to couple with separate fluid sources. In a further implementation, the ducts may also be manufactured in-situ with the distribution system using a DMLS, DMLM, or other additive manufacturing process to form a monolithic distribution system. In the exemplary implementation, aluminum-based alloy powders, corrosion resistant steel-based alloy powders, titanium-based alloy powders, and synthetic rubber compound powders are used to fabricate the fluid distribution line disclosed herein, but other powders that enable the fluid distribution line to function as described herein may be used.

Figure 4:
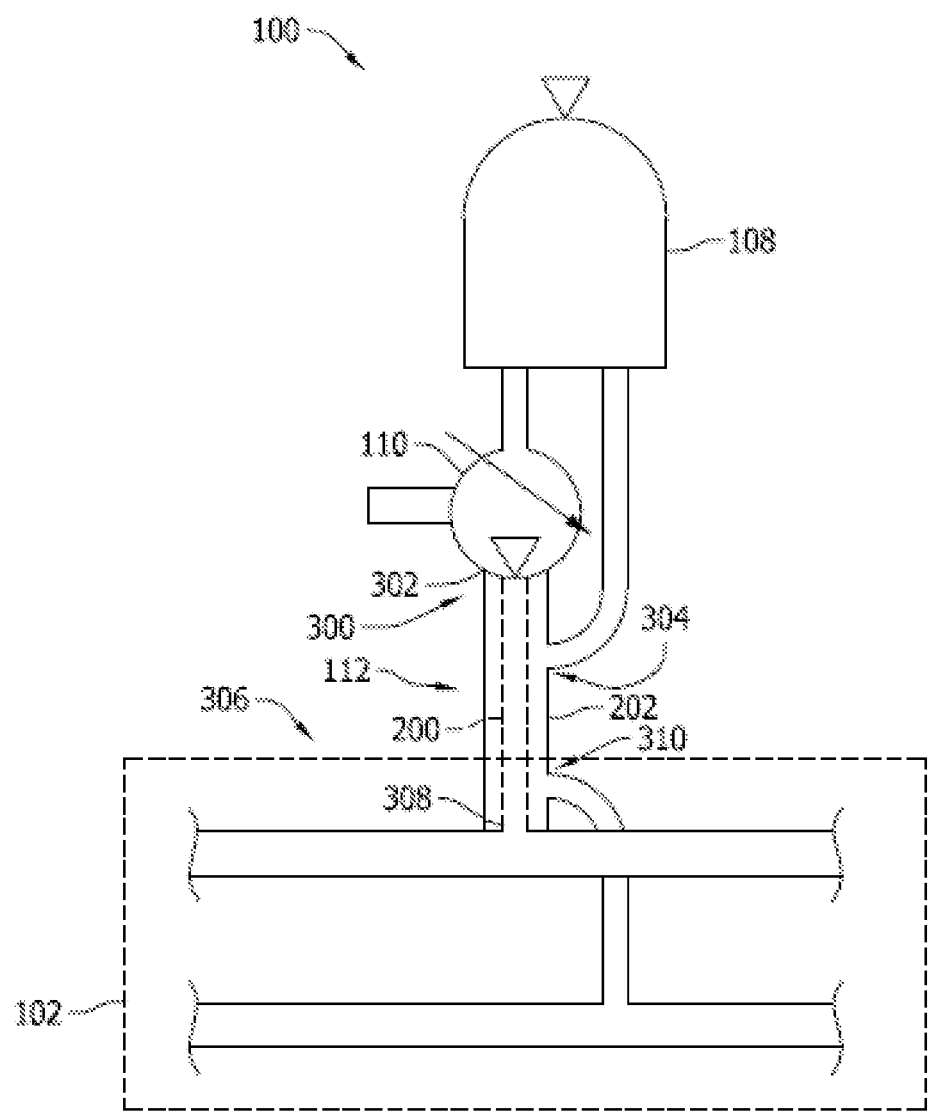
FIG. 4 is a perspective view of the fluid distribution system shown in FIG. 2 and coupled within the hydraulic system shown in FIG. 1.
Figure 5:
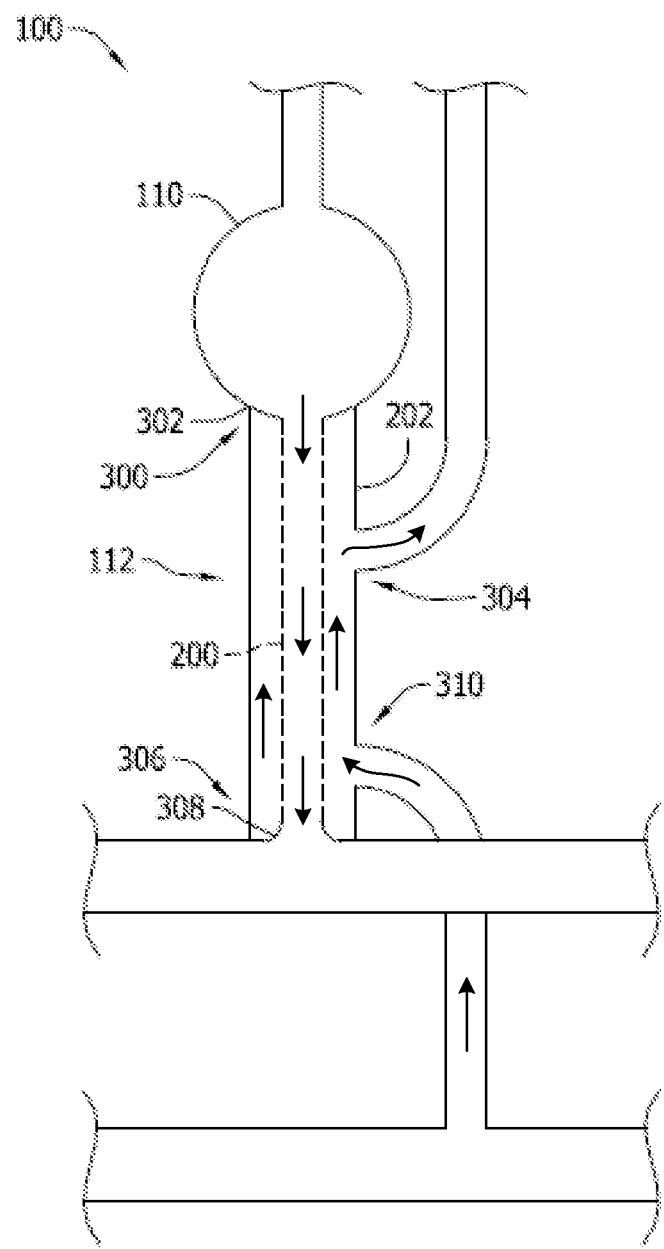
FIG. 5 is an enlarged view showing connections of the fluid distribution system to the aircraft hydraulic system shown in FIG. 4.

FIG. 4 is a perspective view of a fluid distribution system 112 (shown in FIG. 2) that is coupled within hydraulic system 100 (shown in FIG. 1). FIG. 5 is an enlarged view showing connection of fluid distribution system 112 to aircraft hydraulic system 100. In the exemplary implementation, at a first end 300, pressure supply line 200 is in flow communication to pump 110 (shown in FIG. 1). Return line 202 extends about pressure supply line 200 and is coupled to an end plate 302 of pump 110. Return line 202 includes an outlet 304 that is coupled in flow communication to reservoir 108 to channel fluid returning from manifold 102 back into reservoir 108.

In the exemplary implementation, at a second end 306, pressure supply line 200 is coupled in flow communication to an inlet 308 of manifold 102 to enable fluid flow of pressurized fluid from pump 110 into manifold 102. Further, fluid distribution system 112 includes a return line inlet 310 that channels fluid flowing from manifold 102 back towards reservoir 108. In alternative implementations, fluid distribution system 112 may be coupled within system 100 using a separate connection device than the device that couples fluid distribution system 112 to system 100.

Figure 6:
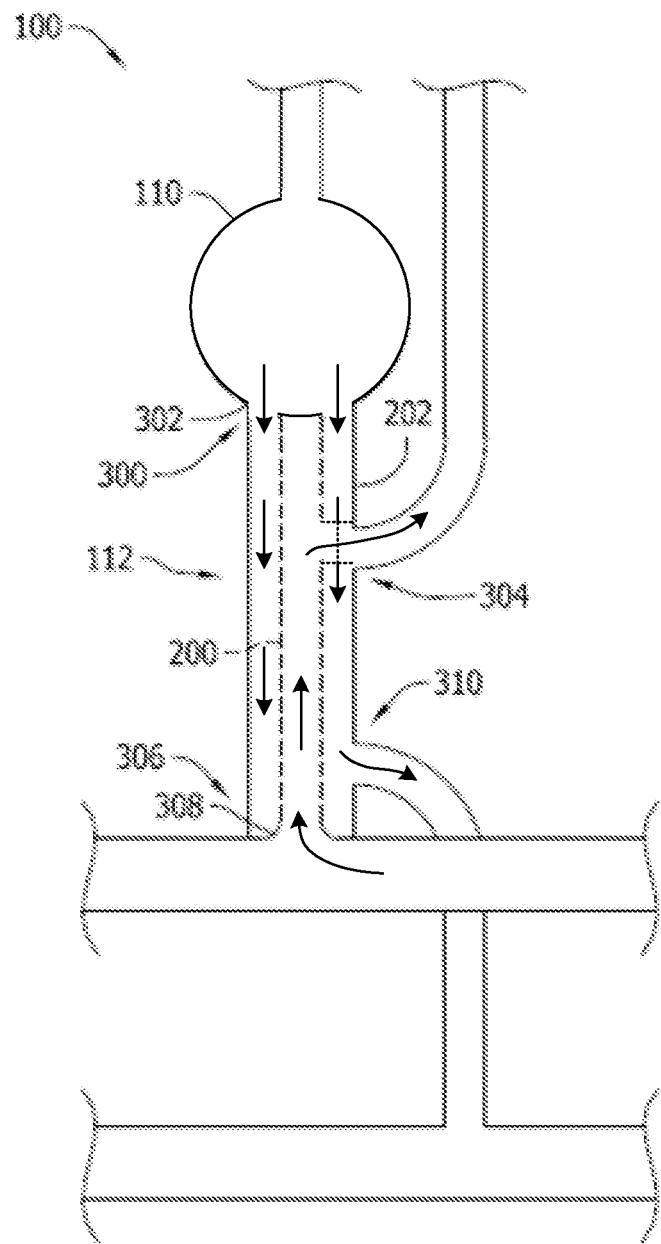
FIG. 6 is a perspective view of an alternative fluid distribution system shown in FIG. 2 and coupled within the hydraulic system shown in FIG. 1.

FIG. 6 is a perspective view of an alternative fluid distribution system shown in FIG. 2 and coupled within the hydraulic system shown in FIG. 1. The distribution system may include ducts that extend from the first and second distribution lines that are configured to connect with separate fluid sources. The system may be structured such that a duct that is coupled in flow communication with the first distribution line extends through a wall of the second distribution line to couple in flow communication with fluid reservoir 108 (shown in FIG. 1). Further, the wall of the second distribution line and the duct may be manufactured in-situ with the distribution system using a DMLS, DMLM, or other additive manufacturing process to form a monolithic distribution system.

Figure 7:
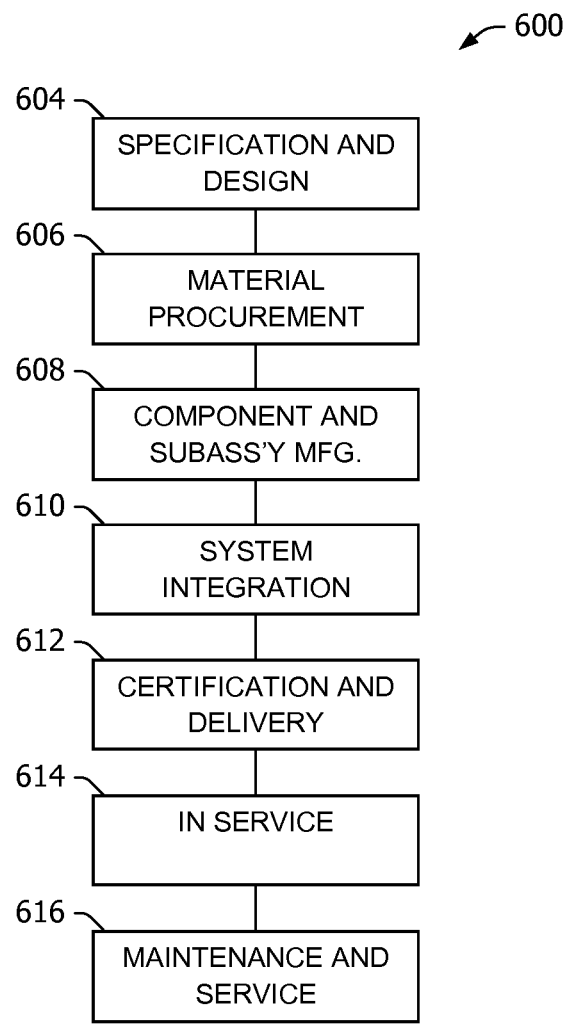
FIG. 7 is a flow diagram of an exemplary aircraft production and service methodology.
Figure 8:
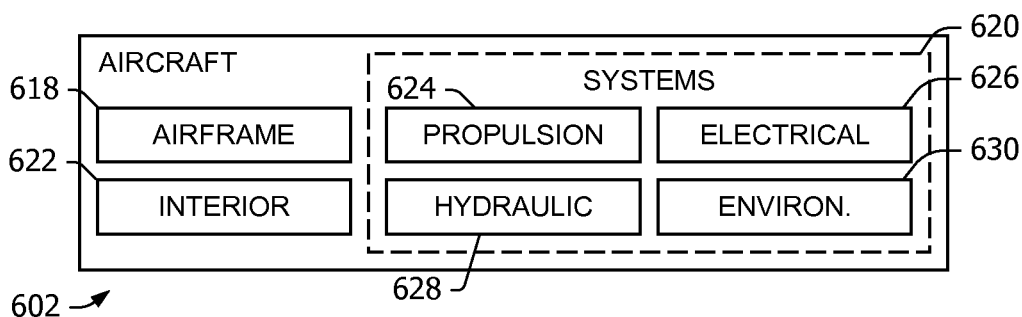
FIG. 8 is a block diagram of an exemplary aircraft that may be fabricated using the system shown in FIG. 1.

The methods and systems described herein are in the context of aircraft manufacturing and service method 600 (shown in FIG. 7) and an aircraft 602 (shown in FIG. 8). Alternatively, the methods and systems described herein may be implemented in any context and/or in any environment involving a fluid distribution system. During pre-production, method 600 may utilize specification and design 604 of the aircraft 602 and/or material procurement 606. During production, component and subassembly manufacturing 608 and system integration 610 of the aircraft 602 occurs. Thereafter, aircraft 602 may go through certification and delivery 612 prior to being placed in service 614. While in service by a customer, aircraft 602 is scheduled for routine maintenance and service 616 (including, for example, modification, reconfiguration, and/or refurbishment).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, an aircraft 602 produced using method 600 may include an airframe 618 having a plurality of systems 620 and an interior 622. Examples of high-level systems 620 may include one or more of a propulsion system 624, an electrical system 626, a hydraulic system 628, and/or an environmental system 630. Any number of other systems may be included. Although an aerospace example is shown, the principles of the invention may be applied to other industries, such as the automotive industry, machinery, and heavy equipment.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus implementations, method implementations, or a combination thereof may be utilized during the production stages 608 and 610, for example, by substantially expediting assembly of or reducing the cost of an aircraft 602. Similarly, one or more of apparatus implementations, method implementations, or a combination thereof may be utilized while the aircraft 602 is in service, for example and without limitation, to maintenance and service 616.

Figure 9:
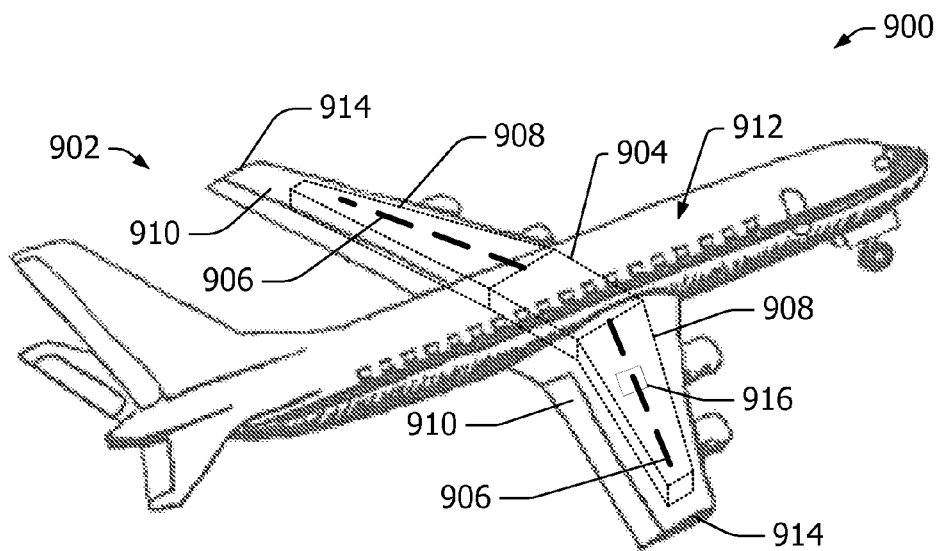
FIG. 9 is a perspective view of a nitrogen system that may be used in an aircraft.

FIG. 9 is a perspective view of a nitrogen system 900 that may be used in an aircraft 902. In the exemplary implementation, nitrogen system 900 includes a nitrogen generation system 904 and a nitrogen distribution system 906. Nitrogen generation system 904 is configured to supply inert nitrogen gases to fuel tanks 908 coupled to each wing 910 of aircraft 902. In the exemplary implementation, nitrogen generation system 904 is located in a fuselage 912 of aircraft 902. In other implementation, nitrogen generation system 904 may be located anywhere within aircraft 902 that enables nitrogen system 900 to function as described herein. Nitrogen distribution system 906 includes tubing that routes nitrogen gas from fuselage 912 through fuel tanks 908 and out towards a wing tip 914.

Figure 10:
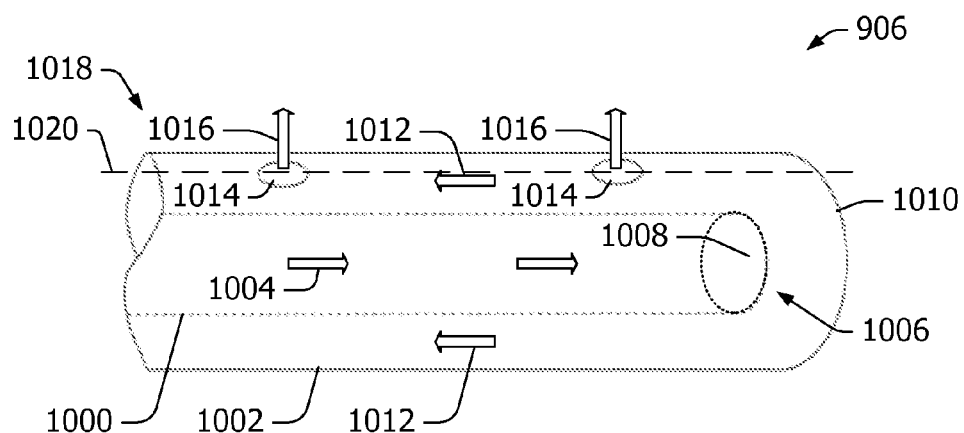
FIG. 10 is an enlarged perspective view of an exemplary nitrogen distribution system that may be used in the nitrogen system shown in FIG. 9.
Figure 11:
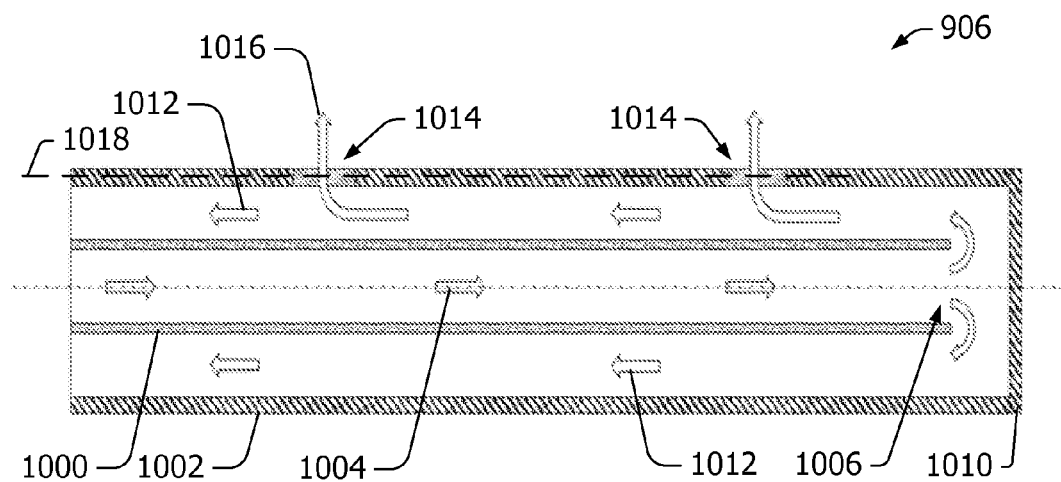
FIG. 11 is an enlarged side view of the nitrogen distribution system shown in FIG. 10.

FIG. 10 is an enlarged perspective view of an exemplary nitrogen distribution system 906 that may be used in nitrogen system 900 (shown in FIG. 9), and FIG. 11 is an enlarged side view of nitrogen distribution system 906. In the exemplary implementation, nitrogen distribution system 906 includes a first, inner line 1000 and a second, outer line 1002. In some implementations, inner line 1000 may be referred to as a "distribution tube", and outer line 1002 may be referred to as a "piccolo tube". Nitrogen distribution system 906 is routed through each wing fuel tank 908 parallel to a wing front spar (not shown).

In the exemplary implementation, inner line 1000 is coupled in flow communication with nitrogen generation system 904 (shown in FIG. 9) for receiving nitrogen gas to be supplied to fuel tanks 908. Inner line 1000 is concentrically positioned within outer line 1002. More specifically, outer line 1002 is radially outward from inner line 1000. Nitrogen distribution system 906 is configured to channel nitrogen in a first direction 1004 via inner line 1000 towards wing tip 914. Inner line 1000 includes a distal end 1006 adjacent wing tip 914. At distal end 1006, inner line 1000 defines an opening 1008.

In the exemplary implementation, outer line 1002 includes a first end 1010 adjacent to inner line distal end 1006. Outer line first end 1010 is closed so as to redirect nitrogen gas flowing out of inner line distal end 1006 back towards fuselage 912 in a second direction 1012. More specifically, outer line first end 1010 receives the nitrogen from inner line 1000, wherein outer line first end 1010 is oriented perpendicular to the flow of fluid in first direction 1004 to redirect the flow of fluid in second direction 1012. Second direction 1012 is substantially opposite first direction 1004. Outer line 1002 includes a plurality of distribution orifices 1014, or apertures, that enables nitrogen gas to flow out of nitrogen distribution system 906 in a third direction 1016. Outer line 1002 includes a termination point 1018 (i.e., open end) within each fuel tank 908. Termination point 1018 is submerged in fuel until sufficient fuel is burned. Once sufficient fuel is burned, termination point 1018 is exposed to an ullage space 916 within fuel tank 908. Distribution orifices 1014 enable the nitrogen to flow out of outer line 1002 and into ullage space 916. In the exemplary implementation, distribution orifices 1014 are positioned at a most vertical location portion 1020 of outer line 1002. However, in other implementations, distribution orifices 1014 may be positioned anywhere on outer line 1002 that enables nitrogen distribution system 906 to function as described herein.

The nitrogen distribution system described herein simplifies installation of the nitrogen enriched air distribution system. The number of installed parts is reduced, thereby reducing weight and significantly lowering installation time. The outer line also acts as a shield for the inner line, protecting it from damage. Further, the space provisions for the nitrogen distribution system are also reduced, which enables using wings having a lower thickness to chord (t/c) ratio.

Figure 12:
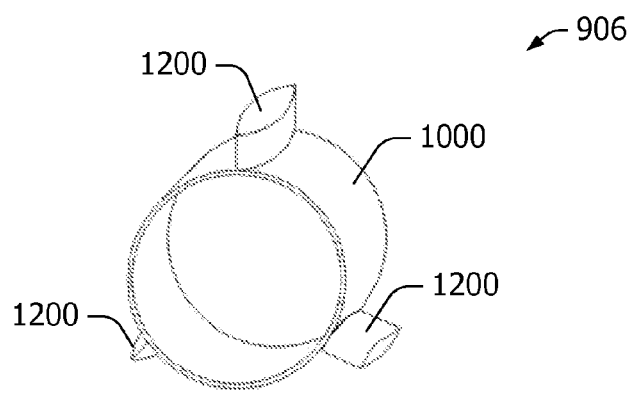
FIG. 12 is an enlarged perspective view of the nitrogen distribution system shown in FIGS. 9-11 including internal support members.

FIG. 12 is an enlarged perspective view of nitrogen distribution system 906 (shown in FIGS. 9-11) including internal support members 1200. In the exemplary implementation, one or more internal support members 1200 extend between inner line 1000 and outer line 1002 to hold inner line 1000 concentric to outer line 1002. Nitrogen distribution system 906 includes at least two internal support members 1200 installed at each end of nitrogen distribution system 906. However, in other implementations, nitrogen distribution system 906 may include any number of internal support members 1200 that enables nitrogen distribution system 906 to function as described herein.

The embodiments described herein facilitate reducing the size and space required for installation of gas distribution lines in an aircraft. More specifically, the above-described systems integrate a pressure supply line within a return line, rather than having separate lines that require more space. The return line reduces stresses on and protects the pressure supply line during installation and operation, enabling a reduction in thickness of the pressure supply line. Further, the above-described gas distribution line reduces weight, installation time, and costs.

A technical effect of the systems and methods described herein includes at least one of: (a) channeling the inert gas in a first direction via a first distribution line; and (b) channeling the inert gas in an opposite second direction via a second distribution line, the second distribution line concentrically aligned with and circumscribing the first distribution line, wherein the second distribution line includes a termination point within the aircraft fuel tank, wherein the second distribution line defines a plurality of distribution orifices that release of the inert gas into an ullage space of the fuel tank.

The implementations described herein relate generally to inert gas systems and, more particularly, to methods and systems for channeling a gas using aircraft inert gas distribution lines. Exemplary implementations of methods and systems for channeling a gas using aircraft inert gas distribution lines are described above in detail. The methods and systems are not limited to the specific implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

An element or step recited in the singular and proceeded with the word "a" or "an" should be understood as not excluding plural elements or steps unless such exclusion is explicitly recited. Moreover, references to "one implementation" of the present invention and/or the "exemplary implementation" are not intended to be interpreted as excluding the existence of additional implementations that also incorporate the recited features.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gas distribution system comprising:
   a first distribution line configured to channel a gas in a first direction; and
   a second distribution line configured to channel the gas in an opposite second direction, said second distribution line concentrically aligned with and circumscribing said first distribution line, wherein said second distribution line includes a termination point within a fuel tank, wherein said second distribution line defines a plurality of distribution orifices that release the gas into an ullage space of the fuel tank.

2. A fluid distribution system in accordance with claim 1, wherein said first distribution line further comprises an inlet for receiving the gas and an outlet for channeling the gas into said second distribution line.

3. A fluid distribution system in accordance with claim 2, wherein the gas is channeled into said second distribution line for release through the plurality of distribution orifices into the ullage space of the fuel tank.

4. A fluid distribution system in accordance with claim 1, wherein said first distribution line comprises a distribution tube configured to channel nitrogen gas from a nitrogen generation system to said second distribution line.

5. A fluid distribution system in accordance with claim 1, wherein said second distribution line further comprises a first end for receiving the gas from said first distribution line, wherein said first end is oriented perpendicular to a flow of gas in the first direction to redirect the flow of gas in the second direction.

6. A fluid distribution system in accordance with claim 1, wherein said second distribution line comprises a piccolo tube configured to channel nitrogen gas received from said first distribution line into the ullage space of the fuel tank.

7. A fluid distribution system in accordance with claim 1, further comprising at least one support member coupled to an outer surface of said first distribution line and to an inner surface of said second distribution line to hold said first distribution line concentric to said second distribution line.

8. A method of distributing an inert gas to an aircraft fuel tank, said method comprising:
   channeling the inert gas in a first direction via a first distribution line; and
   channeling the inert gas in an opposite second direction via a second distribution line, the second distribution line concentrically aligned with and circumscribing the first distribution line, wherein the second distribution line includes a termination point within the aircraft fuel tank, wherein the second distribution line defines a plurality of distribution orifices that release the inert gas into an ullage space of the fuel tank.

9. A method in accordance with claim 8, wherein channeling an inert gas in a first direction via a first distribution line further comprises:
   receiving the inert gas via an inlet of the first distribution line; and
   channeling the inert gas into the second distribution line.

10. A method in accordance with claim 9, wherein channeling the inert gas into the second distribution line further comprises channeling the inert gas into the second distribution line for release through the plurality of distribution orifices into the ullage space of the fuel tank.

11. A method in accordance with claim 9, further comprising:
    receiving nitrogen gas via the inlet of the first distribution line; and
    channeling the nitrogen gas into the second distribution line via an outlet of the first distribution line.

12. A method in accordance with claim 8, wherein the first distribution line includes a distribution tube, said method further comprising channeling nitrogen gas received from a nitrogen generation system to the second distribution line.

13. A method in accordance with claim 8, wherein channeling the inert gas in a second direction further comprises receiving the inert gas from the first distribution line via a first end of the second distribution line, wherein the first end is oriented perpendicular to a flow of inert gas in the first direction to redirect the flow of inert gas in the second direction.

14. A method in accordance with claim 8, wherein the second distribution line includes a piccolo tube, said method further comprising channeling nitrogen gas received from the first distribution line into the ullage space of the fuel tank.

15. A method in accordance with claim 8, further comprising coupling at least one support member to an outer surface of the first distribution line and to an inner surface of the second distribution line to hold the first distribution line concentric to the second distribution line.

16. An aircraft inert gas system comprising:
    an inert gas generation system positioned within a fuselage of the aircraft; and
    an inert gas distribution system comprising:
        a first distribution line configured to channel inert gas in a first direction; and a second distribution line configured to channel the inert gas in an opposite second direction, said second distribution line concentrically aligned with and circumscribing said first distribution line, wherein said second distribution line includes a termination point within a fuel tank, wherein said second distribution line defines a plurality of distribution orifices that release the inert gas into an ullage space of the fuel tank.

17. A system in accordance with claim 16, wherein said first distribution line further comprises an inlet for receiving the inert gas and an outlet for channeling the inert gas to said second distribution line for release through the plurality of distribution orifices into the ullage space of the fuel tank.

18. A system in accordance with claim 16, wherein said second distribution line further comprises a first end for receiving the inert gas from said first distribution line, wherein said first end is oriented perpendicular to the flow of inert gas in the first direction to redirect the flow of inert gas in the second direction.

19. A system in accordance with claim 16, wherein said first distribution line comprises a distribution tube configured to channel nitrogen gas from said inert gas generation system to said second distribution line, and said second distribution line comprises a piccolo tube configured to channel nitrogen gas received from said first distribution line into the ullage space of the fuel tank.

20. A system in accordance with claim 16, further comprising at least one support member coupled to an outer surface of said first distribution line and to an inner surface of said second distribution line to hold said first distribution line concentric to said second distribution line.

* * * * *